United States Patent [19]

Hawkins

[11] 3,792,345

[45] Feb. 12, 1974

[54] CHECKING AND CALIBRATION OF APPARATUS INCORPORATING A RESONANT CIRCUIT

[75] Inventor: Francis Hawkins, Newport Pagnell, England

[73] Assignee: Newport Instruments Limited, Newport, Pagnell, England

[22] Filed: Apr. 14, 1972

[21] Appl. No.: 244,089

[30] Foreign Application Priority Data
Apr. 16, 1971  Great Britain...................... 9628/71

[52] U.S. Cl.............................................. 324/.5 R
[51] Int. Cl. .......................................... G01n 27/78
[58] Field of Search... 324/.5 R, .5 A, .5 AC, .5 AH

[56] References Cited
UNITED STATES PATENTS
3,531,715  9/1970  Watson............................. 324/.5 A

OTHER PUBLICATIONS

Calibrated Sensitivity Measurements of Nuclear Magnetic Resonance Spectrometers, M. S. Adler & S. D. Senturia – Rev. of Sci. Instr. – 40(11)–Nov. 1969, pp. 1,481–1,483.

Primary Examiner—Michael J. Lynch
Attorney, Agent, or Firm—Young & Thompson

[57] ABSTRACT

In the use of spectrometric apparatus incorporating a resonant circuit an artificial signal is generated for checking, calibration or measurement purposes. The artificial signal is generated by periodically switching a resistance into and out of circuit with the resonant circuit, preferably also biasing out the normal resonance signals. It is particularly applicable to the monitoring of on-line flow systems.

11 Claims, 5 Drawing Figures

CHECKING AND CALIBRATION OF APPARATUS INCORPORATING A RESONANT CIRCUIT

1. Field of the Invention

This invention relates to methods of and apparatus for generating an artificial signal for checking, calibration or measuring purposes effected in connection with apparatus incorporating a resonant circuit. It is particularly applicable to electron spin resonance and nuclear magnetic resonance apparatus but is not limited thereto.

2. Description of the Prior Art

Electron spin resonance and nuclear magnetic resonance techniques have been developed for measurement and control purposes in a wide variety of processes. For instance, they have been used for making quantitative measurements of the proportions of the products of a chemical process and for controlling the proportions of the constituents of food manufacturing processes. It is commonly necessary to calibrate apparatus utilising such techniques at intervals by making measurements on a reference sample or samples of known constitution. This method of calibration suffers from various disadvantages. Any resonance technique involving the absorption of electromagnetic energy is sensitive to changes in the sample temperature. It is therefore necessary to know or control the temperature of the reference sample or samples in order to be able to use them accurately for calibration purposes. In addition, many products are not stable and therefore there is the danger that the reference samples, even when properly protected, may change their constitution over a period of time.

It is best when using such a reference sample to clear the apparatus of any other sample before inserting the reference sample so that the signal which is measured shall be due to the reference sample alone. This is not always convenient and may be impossible where the apparatus is being used to measure the constituents of a material in an on-line process. Here it will normally be the case that the material to be measured will be transported through the measuring apparatus by means of a pipe or a conveyor belt. To remove such a pipe or conveyor belt might involve dismantling or partially dismantling the measuring head. The head would then have to be rebuilt to make the measurement on the reference sample and finally dismantled and rebuilt again round the pipe or conveyor belt. One way of overcoming the problem of calibrating on-line apparatus has been to use two measuring heads, one permanently mounted on-line and one containing the reference sample. However, this method involves switching between the two measuring heads and does not, in fact, check the operation of the measuring head which is in use on-line. Any slow change in the sensitivity of this latter measuring head would be undetected and could lead to a gradual degradation of the results obtained or of the quality control of a monitored process.

SUMMARY OF THE INVENTION

It is one object of the present invention to provide a method of and means for checking or calibrating resonance apparatus which does not have the above-mentioned disadvantages. The invention has particular application to on-line systems but is equally applicable to static analytical systems.

It is a further object of the present invention to provide a method of and means for direct digital measurement of a resonance signal from a sample.

In accordance with one aspect of the present invention there is provided a method of calibrating or checking spectrometric apparatus or using such apparatus to measure the condition or properties of a material, the spectrometric apparatus incorporating oscillator means having a resonant circuit comprising a sensing coil arranged to surround a sample of a material under test and through which a high frequency oscillatory magnetic field can be applied to the sample, which comprises connecting a resistance and switch means across the oscillator resonant circuit, and controlling said switch means to periodically connect said resistance into and out of circuit across the resonant circuit to generate a train of artificial pulses.

In accordance with another aspect of the invention there is provided spectrometric apparatus comprising magnetic means providing a unidirectional magnetic field, oscillator means having a resonant circuit comprising a sensing coil arranged to surround a sample of a material under test and through which a high frequency oscillatory magnetic field can be applied to the sample perpendicular to said unidirectional magnetic field, a resistance and switch means connected across the oscillator resonant circuit, and drive circuit means connected to said switch means and arranged to periodically trigger said switch means to connect said resistance into and out of circuit across the resonant circuit to generate a train of artificial pulses.

The said further object is achieved by a potentiometric method of measurement of the signal intensity involving creation of the artificial signal by switching said resistance out of circuit during the normal resonance periods. The train of artificial pulses thereby produced is of opposite polarity to that of the normal resonance pulses and can be used to provide a direct measurement of the latter.

BRIEF DESCRIPTION OF THE DRAWINGS

In order that the invention may be fully understood, various embodiments thereof will now be described by way of example and with reference to the accompanying drawings, in which.

DESCRIPTION OF THE PREFERRED EMBODIMENT

Although the following description is given with particular reference to a nuclear magnetic resonance spectrometer, it should be realised that the invention is also applicable to other apparatus incorporating a resonant circuit.

Figure 1:
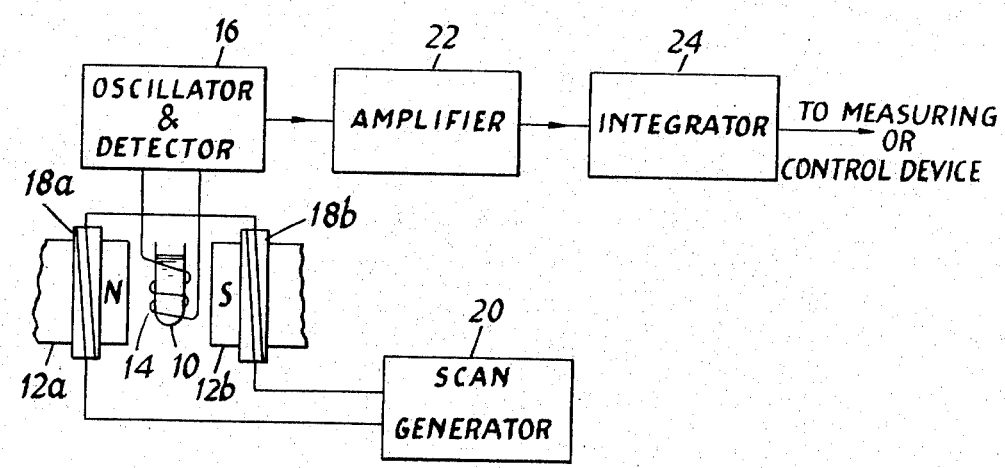
FIG. 1 is schematic diagram of the basic features of a known nuclear magnetic resonance spectrometer used for measuring the intensity of the absorption signal.
Figure 2:
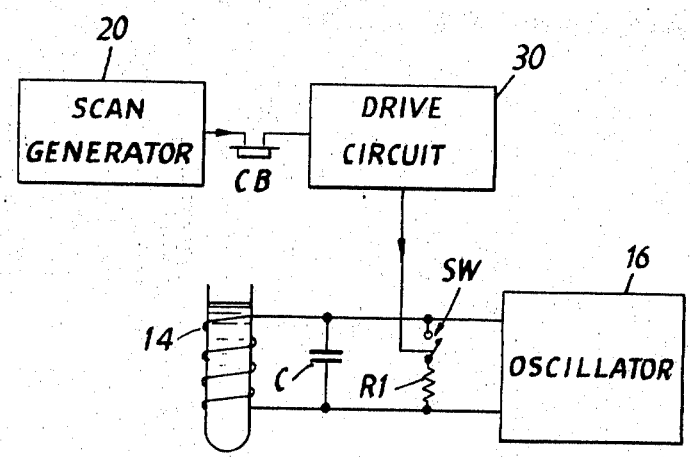
FIG. 2 is a schematic diagram illustrating the principle of how the spectrometer of FIG. 1 is adapted in accordance with one embodiment of the invention to provide an artificial calibrating or measuring signal.

As shown in FIGS. 1 and 2, a sample 10 is subjected simultaneously to a unidirectional magnetic field $H_0$ provided by a magnet 12a, 12b and to an oscillatory r.f. magnetic field $H_1$ at right-angles to the direction of the magnetic field $H_0$. The oscillatory field $H_1$ is provided by a coil 14 wound around the sample 10 and connected to an oscillator and detector circuit 16. When the frequency $f$ of the oscillator and the strength of the unidirectional field $H_0$ have a special relationship given by the formula $$f = (1/2\pi)yH_0$$

nuclear magnetic resonance occurs and an energy exchange takes place between the oscillator and the nuclei of the isotope having the particular value of gyromagnetic ratio $y$. Under certain circumstances the energy absorbed by the nuclei in question is a measure of the total number of nuclei of that species present in the sample. As the relative abundance of the various isotopes of an element derived from natural sources is usually constant, the method can be used, as is well-known, to measure the amount of a particular element in the sample. As the resonant nuclei of the sample can only absorb a limited amount of energy at any one time it is usual to make the process a periodic one by adding an oscillatory component to the unidirectional field, for example by providing scan coils 18a, 18b positioned on the pole pieces of the magnet 12a, 12b and connected to a scan generator 20. Each time the field is swept through the resonance value, energy is absorbed from the oscillator 16 and the resultant modulation of the oscillator voltage is detected and amplified in amplifier 22. The train of resonance absorption pulses is then rectified and finally integrated in an integrator 24 to provide the desired measurement or control signal. In a preferred arrangement a triangular-wave scanning field modulation is applied to the unidirectional field. An alternative known means of obtaining the same result, i.e. a train of resonance absorption pulses, is to modulate the frequency of the r.f. field produced by the oscillator 16.

As the resonance pulses represent power absorbed, the sample 10 can be thought of as providing an extra periodic loading of the tuned circuit of the oscillator 16. It has now been appreciated in accordance with the present invention that the nuclear resonance in the sample has an effect on the oscillator circuit similar to that which would be produced by connecting a resistance across the oscillator tuned circuit each time the field passes through the resonance value for the sample.

This is the principle on which the method and apparatus of the present invention for providing an artificial calibrating or measuring signal is based. As shown in FIG. 2, a stable resistance R1 in series with a suitable switch SW is periodically connected across the tuned circuit of the oscillator 16 comprising the coil 14 and a capacitance C. The switch SW is controlled by a drive circuit 30 here arranged to be triggered by the output of the scan generator 20 through a control push-button CB. The power absorbed from the tuned circuit when the switch SW is made will depend on the value of the resistance R1 but a calibrating signal in the form of a train of square pulses can be produced. The total integrated signal will depend on the value of the resistance R1 and the length of time during each cycle that the switch SW is made, these factors affecting the amplitude and duration of the calibrating signal pulses respectively. The value of the resistance R1 and the "make" time of the switch SW can both be readily adjusted to provide a wide range of calibrating signals. If desired, a plurality of resistors connected in parallel and with respective switches can be used in place of the single resistance R1 to provide a predetermined gradation of calibrating signals. The square-pulse calibrating signal thereby obtained can be added to the bell-shaped pulse resonance signal, or alternatively and preferably the resonance signal can be removed during generation of the calibration signal. This may be done either by physically removing the sample or, where this is not possible or desirable, the unidirectional field $H_0$ may be given a bias to move it temporarily away from the resonance value. If this is done, for example by means of the scan generator 20, at the same time as the artificial signal is produced then the sample resonance pulses will be replaced by the calibrating signal square pulses. This calibrating procedure may be instigated by the operator who can then use the calibrating signals to check the sensitivity of the apparatus. Alternatively, it may be arranged for the calibration procedure to be instigated automatically at predetermined time intervals with automatic adjustment of sensitivity in dependence on the calibration signals.

Figure 3:
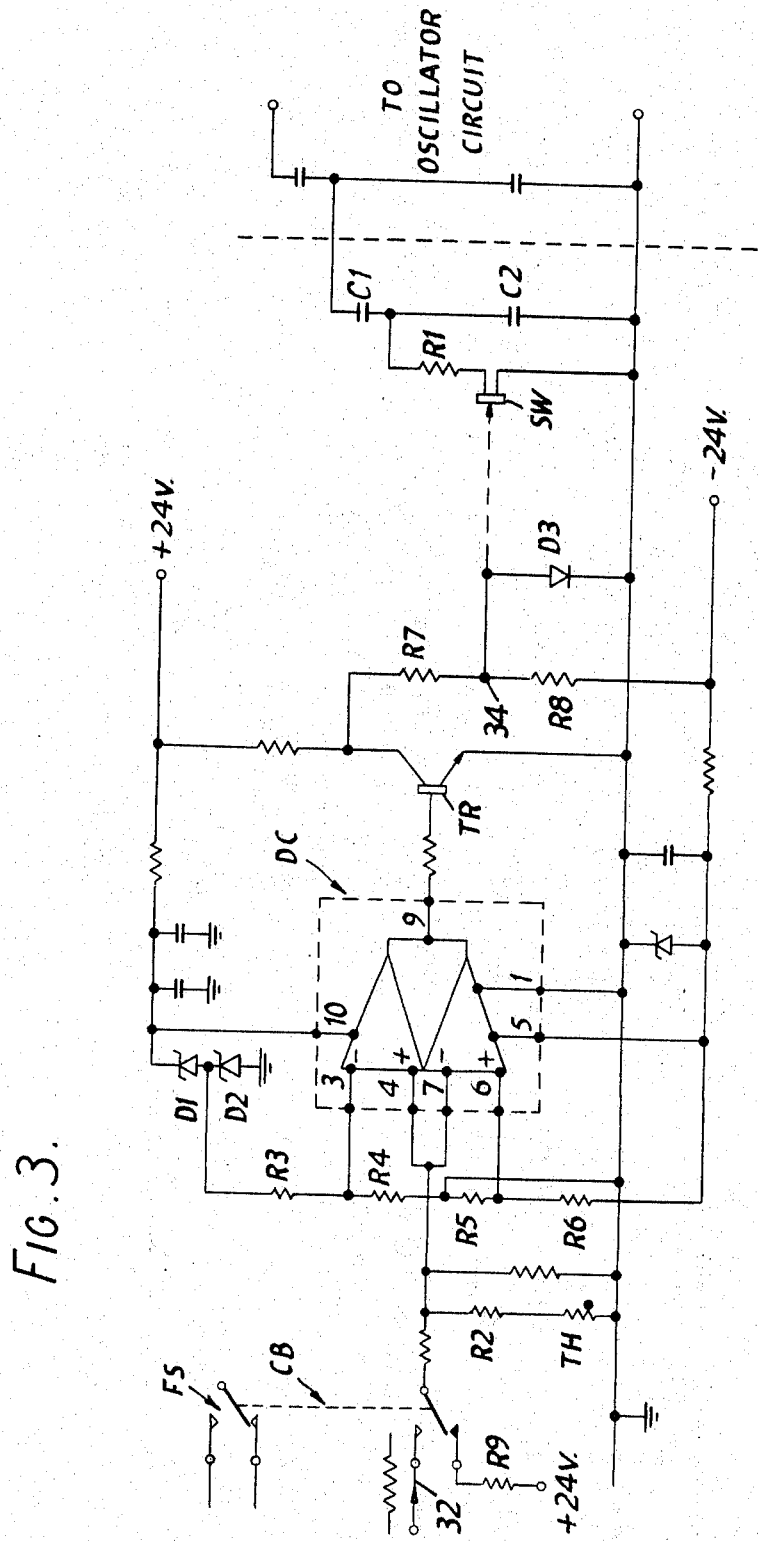
FIG. 3 is a circuit diagram showing a preferred embodiment of drive circuit and switching circuit for producing the artificial calibrating or measuring signal.
Figure 4:
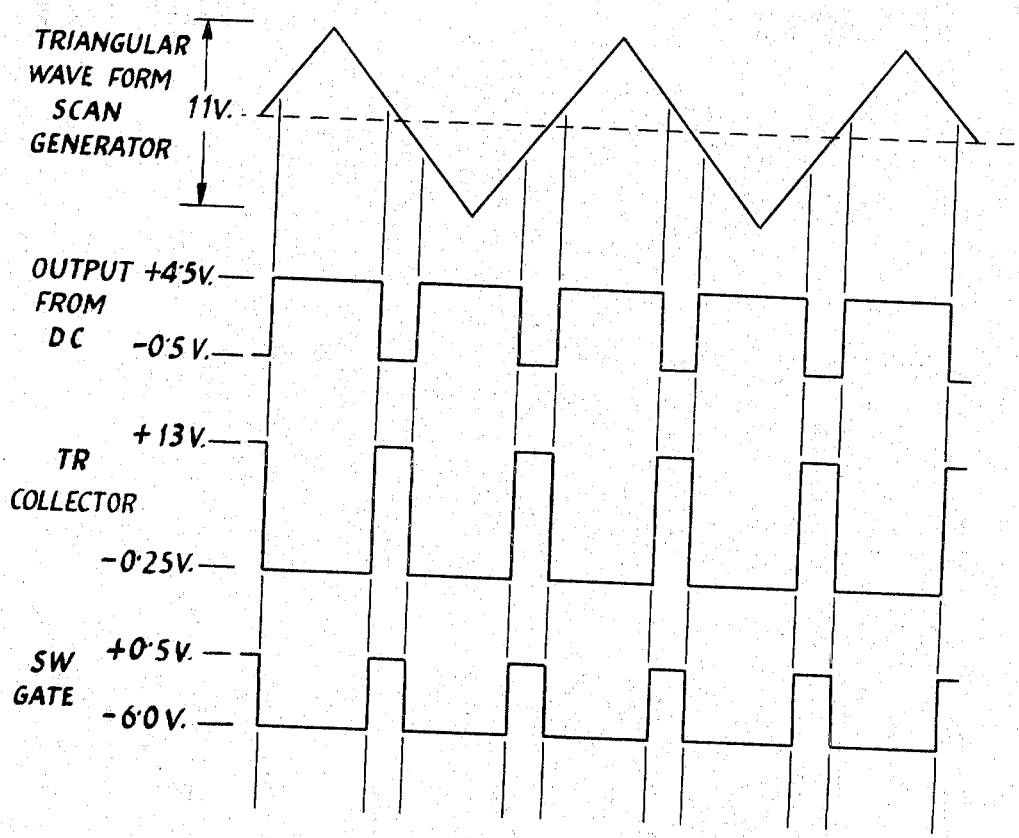
FIG. 4 shows the waveform occurring at various points in the circuit of FIG. 3; and, FIG. 5 is a circuit diagram showing part of FIG. 3 modified to produce a direct measurement of the resonance signals from a sample.

Referring now to FIG. 3 which shows in more detail the drive circuit 30 and a preferred form of switch SW, and to FIG. 4 which shows the waveforms at certain points in the circuit of FIG. 3, the resistance R1 is indicated as a high stability 3.9K resistor which is connected in series with a field-effect transistor switch SW. The resistor R1 and switch SW are connected across the tuned circuit of the oscillator of the n.m.r. spectrometer through a capacitive potential divider C1, C2. The field-effect transistor switch SW is turned on and off by a transistor switch TR which is operated by the output of a dual-input differential comparator DC.

The differential comparator DC consists of two operational amplifiers OP1 and OP2 mounted in a single package. Each amplifier has the usual inverting and non-inverting input terminals. The output terminals are commoned and brought out at pin 9. Each amplifier has two output states: (a) negative, when the output is approximately −0.5 volts; and (b) positive, when the output is approximately +4.5 volts. If both amplifiers are negative the output at pin 9 will be negative, but if one or both amplifiers are positive the output will be positive.

The supplies to the comparator DC are taken from +24V and −24V lines. The voltages applied to the comparator DC are reduced to +13.6V and −6.8V by means of series resistors and Zener diodes. The positive Zener stabiliser comprises two 6.8V Zener diodes D1, D2 to preserve symmetry of the input bias circuit. The two remaining comparator inputs at pins 4 and 7 are connected to the triangular-wave scan generator on line 32 by way of the "calibrate" push-button CB. As the sensitivity of the differential comparator DC increases with increasing temperature, thus resulting in the generated pulse becoming narrower, a thermistor TH in series with a resistance R2 is connected in the input circuit of the comparator to provide compensation.

With no input triangular waveform from the scan generator each comparator amplifier OP1, OP2 is biased into the negative output stage by means of the resistors R3, R4 and R5, R6, the amplifier OP1 having a positive bias on the inverting terminal and the amplifier OP2 having a negative bias on the non-inverting terminal. This means that the transistor TR is cut off, its collector is positive, and the junction point 34 of resistors R7 and R8 is clamped to approximately +0.5V by a diode D3. The field-effect transistor SW is therefore turned on and is in its low resistance state. This connects the capacitor network from the n.m.r. oscillator to earth via the resistor R1.

If either of the comparator amplifiers OP1, OP2 is then made to go positive, the transistor TR will be turned on, it collector will be bottomed, and the junction point 34 will go negative. The diode D3 will then cut off and the field-effect transistor SW will receive approximately −6.0V. It will therefore go into its high resistance state and disconnect the resistor R1 from earth.

In operation, a triangular scan waveform of for example 11 volts peak-to-peak amplitude is applied on line 32 on the comparator DC when the calibrating signal is required. Whenever the triangular waveform exceeds the bias voltage by a few millivolts the operational amplifiers OP1, OP2 will produce a positive output and switch the transistor TR on and the field-effect transistor SW off. This means, as shown clearly in FIG. 4, that the field-effect transistor SW is switched off for the greater part of the scan cycle and is only switched on for a short period, for example 4 to 5 msecs, when the scan waveform is passing through zero, i.e. near the normal resonance value.

The result is that the resistor R1 is connected across the tuned circuit of the n.m.r. oscillator for 4 to 5 msecs. at the time of occurrence of the normal resonance pulses and produces a loss in the tuned circuit analogous to the absorption of energy into the sample. As mentioned above, this results in a train of square pulses whose amplitude and duration may be adjusted by varying the resistance R1 and the bias levels of the comparator DC respectively.

As it is not desirable that the resistor R1 should be connected across the oscillator tuned circuit during normal operation, the scan signal input to the comparator DC is taken to a positive supply via a resistor R9 when the calibrate button CB is released, i.e. during normal operation. The field-effect transistor SW is therefore turned off.

In order to remove the normal resonance pulse singals during a calibration test, a second pair of contacts FS on the calibrate button CB are provided, connected to suitable control means associated with the magnet, to cause a shift of field of the n.m.r. magnet during calibration by biasing the field away from the resonance value during the time that the calibration button is depressed.

Figure 5:
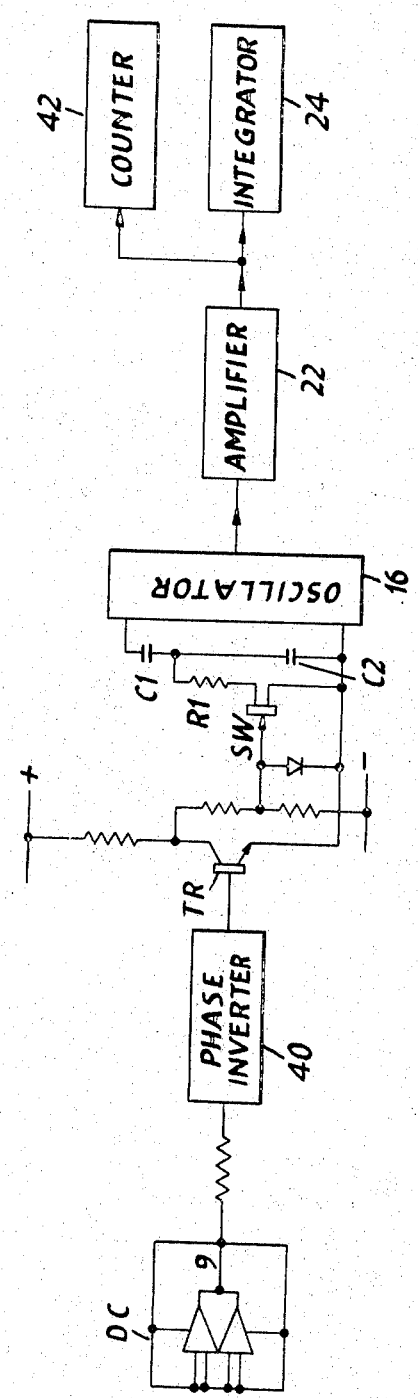

Another application of this method of providing an artificial signal in accordance with the invention involves switching the resistor R1 out of circuit during the normal resonance periods rather than into circuit. This is illustrated in FIG. 5 and can be effected for example by adding a phase-inverting transistor stage 40 between the comparator DC and the transistor TR. As a consequence there will be less power absorbed during the normal resonance periods. The train of artificially created square pulses will then have the opposite polarity and if integrated will give a signal of opposite polarity to that of the sample resonance pulses. This then gives a potentiometric method of measuring the signal intensity of the resonance pulses. For instance, the total signal, i.e. the total pulse area, from a fixed number of resonances from an unknown sample may first be stored in the integrator 24. By depressing the push-button CB a train of artificial signal pulses of opposite polarity may then be fed to the integrator 24 to discharge the integrator to zero. As the artificial signal pulses are all of the same area, counting in a counter 42 the number required to discharge the integrator 24 to zero gives a direct digital measurement of the resonance signal from the unknown sample. The artificial signal pulses are not in this case being used for calibration or checking purposes but for direct digital measurement of the resonance signal from the sample. Provided that the sensitivity of the apparatus does not change during the integration and discharge period this method will be insensitive to long term changes in sensitivity due to temperature, ageing, etc. Care must of course be exercised in the design of the circuit for generating the artificial calibration or measurement signals to make it insensitive to temperature changes and the like.

Although a field-effect transistor switch SW has been described above as a preferred form of switching device it should be appreciated that other switching means capable of performing the required switching function may alternatively be used.

Although in the preferred embodiment described above the resistanc R1 is shown and described as being connected in parallel with the sensing coil which forms part of the resonant circuit of the oscillator, it would be possible alternatively to connect a relatively lower value resistance in series with the sensing coil and achieve substantially the same effect. At the prsent time, in view of the characteristics of present field-effect transistor switches it is preferable to connect the resistor R1 in parallel with the sensing coil. With a resistance R1 connected in series with the sensing coil any consequent changes in the circuit connections which would be necessary would be obvious to one skilled in this art.

I claim:

1. A method of calibrating or checking spectrometric apparatus or using such apparatus to measure the condition or properties of a material, the spectrometric apparatus incorporating oscillator means having a resonance circuit comprising a sensing coil arranged to surround a sample of a material under test and through which a high frequency oscillatory magnetic field can be applied to the sample, the method comprising positioning the sample within a unidirectional magnetic field, subjecting the sample to a high frequency oscillatory magnetic field at right-angles to the direction of the unidirectional field, connecting a resistance and switch means in circuit with the oscillator resonance circuit, controlling said switch means to switch said resistance periodically into and out of circuit with the resonance circuit to generate a train of artificial pulses, and during the generation of said artificial pulses inhibiting the generation of resonance pulses from the sample by biassing the magnetic field in which the sample is located.

2. A method as claimed in claim 1, in which said resistance is connected into or out of circuit with the resonance circuit at such times as to cause the artificial pulses to be generated substantially at the normal times of occurrence of resonance pulses from the sample.

3. A method as claimed in claim 1, in which the switch means is controlled from a scan waveform generator which also modulates the field strength of the unidirectional magnetic field in which the sample is located to cause the resultant magnetic field to pass through the resonance condition for the sample.

4. A method as claimed in claim 3, in which the switch means is actuated to connect the resistance into or out of circuit with the resonance circuit for a period of between 4 and 5 milliseconds in each scan waveform cycle.

5. A method of using spectrometric apparatus to measure the condition or properties of a material, the spectrometric apparatus incorporating oscillator means having a resonance circuit comprising a sensing coil arranged to surround a sample of a material under test and through which a high frequency oscillatory magnetic field can be applied to the sample, the method comprising positioning the sample within a unidirectional magnetic field, subjecting the sample to a high frequency oscillatory magnetic field at right-angles to the direction of the unidirectional field, connecting a resistance and switch means in circuit with the oscillator resonance circuit, controlling said switch means to switch said resistance periodically into and out of circuit with the resonance circuit to generate artificial pulse of opposite polarity to the resonance pulses from the sample, feeding a predetermined number of resonance pulses from the sample to integrating means, feeding a train of said artificial pulses to said integrating means to discharge the integrating means to zero, and counting the number of artificial pulses in said train thereby to give a measurement of the resonance signal from the sample.

6. Spectrometric apparatus comprising magnetic means providing a unidirectional magnetic field, oscillator means having a resonance circuit comprising a sensing coil arranged to surround a sample of a material under test and through which a high frequency oscillatory magnetic field can be applied to the sample perpendicular to said unidirectional magnetic field, a resistance and switch means connected in circuit with the oscillator resonance circuit, drive circuit means connected to said switch means and arranged to trigger said switch means to switch said resistance periodically into and out of circuit with the resonance circuit thereby to generate a train of artificial pulses, and biasing means operative only during the generation of said artificial pulses to bias the magnetic field in which the sample is located and inhibit the generation of resonance pulses from the sample.

7. Apparatus as claimed in claim 6, which includes a scan waveform generator which is arranged to modulate the field strength of said unidirectional magnetic field to cause the resultant magnetic field to pass through the resonance condition for the sample and which is also arranged to provide actuating signals for said drive circuit means.

8. Apparatus as claimed in claim 7, in which said drive circuit means comprises a differential comparator having one input connected to receive the output of the scan waveform generator and the other input connected to receive bias voltages, and a transistor switch connected between the output of the comparator and said switch means, the drive circuit means and switch means being connected in such manner that with no input from the scan waveform generator said switch means is turned off and with an input from the scan waveform generator said switch means is turned on for a proportion only of each scan waveform cycle.

9. Apparatus as claimed in claim 8, which includes temperature compensation means comprising a thermistor connected into the input circuit of the comparator.

10. Spectrometric apparatus comprising magnetic means providing a unidirectional magnetic field, oscillator means having a resonance circuit comprising a sensing coil arranged to surround a sample of material under test and through which a high frequency oscillatory magnetic field can be applied to the sample perpendicular to said unidirectional magnetic field, a resistance and switch means connected in circuit with the oscillator resonance circuit, drive circuit means connected to said switch means and arranged to trigger said switch means to switch said resistance periodically into and out of circuit with the resonance circuit thereby to generate artificial pulses of opposite polarity to the resonance pulses from the sample, integrator means connected to be charged by said resonance pulses and to be discharged by said artificial pulses, and counter means arranged to provide a measure of the number of artificial pulses fed to said integrator means.

11. Apparatus as claimed in claim 10, in which the switch means comprises a field-effect transistor.

* * * * *